US010791016B2

(12) United States Patent
Gomadam et al.

(10) Patent No.: US 10,791,016 B2
(45) Date of Patent: Sep. 29, 2020

(54) SYMBOL PHASE ADJUSTMENT FOR WIRELESS COMMUNICATION NETWORKS

(71) Applicant: Facebook, Inc., Menlo Park, CA (US)

(72) Inventors: Krishna Gomadam, San Jose, CA (US); Djordje Tujkovic, Mountain View, CA (US)

(73) Assignee: Facebook, Inc., Menlo Park, CA (US)

( * ) Notice: Subject to any disclaimer, the term of this patent is extended or adjusted under 35 U.S.C. 154(b) by 110 days.

(21) Appl. No.: 16/174,181

(22) Filed: Oct. 29, 2018

(65) Prior Publication Data

US 2019/0097863 A1    Mar. 28, 2019

Related U.S. Application Data

(63) Continuation-in-part of application No. 15/382,685, filed on Dec. 18, 2016, now Pat. No. 10,149,337.
(Continued)

(51) Int. Cl.
*H04L 27/34* (2006.01)
*H04L 27/26* (2006.01)
(Continued)

(52) U.S. Cl.
CPC ........ *H04L 27/3444* (2013.01); *H04L 5/0073* (2013.01); *H04L 27/18* (2013.01);
(Continued)

(58) Field of Classification Search
CPC ...... H04B 7/022; H04B 7/0682; H04B 7/084; H04B 7/0894; H04B 1/712; H04L 1/08;
(Continued)

(56) References Cited

U.S. PATENT DOCUMENTS

| 6,473,506 B1 | 10/2002 | Hook et al. |
| 8,830,917 B1 | 9/2014 | Zhang et al. |

(Continued)

FOREIGN PATENT DOCUMENTS

| CH | 103763062 | 4/2014 |
| WO | WO2006039936 | 4/2002 |

OTHER PUBLICATIONS

PCT/US2016/067861; PCT International Search Report, dated Mar. 30, 2017.
PCT/US2016/067861; Written Opinion of the International Searching Authority, dated Mar. 30, 2017.

*Primary Examiner* — Harun Chowdhury
(74) *Attorney, Agent, or Firm* — Brian R Short

(57) ABSTRACT

Apparatuses, methods, and systems for dynamic bandwidth allocation are disclosed. One method includes communicating, by a plurality wireless nodes, with each other through a plurality of wireless links, and wherein each wireless link of the plurality of nodes is assigned a specific symbol phase rotation based on a classification of the wireless link, constructing, by a node, a packet including data that is to be transmitted to a receiving node in the wireless network, wherein the constructed packet includes a plurality of symbols, retrieving the specific symbol phase rotation based on the classification of the specific wireless link over which the plurality of symbols are to be transmitted over, rotating a phase of each successive symbol based on the specific symbol phase rotation of the specific wireless link, and based on a position of the symbol within the constructed packet, and controlling transmission of the constructed packet.

18 Claims, 12 Drawing Sheets

Related U.S. Application Data which is a continuation-in-part of application No. 15/248,297, filed on Aug. 26, 2016, now Pat. No. 10,193,648, and a continuation-in-part of application No. 15/248,378, filed on Aug. 26, 2016, now Pat. No. 10,177,870.

(60) Provisional application No. 62/582,444, filed on Nov. 7, 2017, provisional application No. 62/273,993, filed on Dec. 31, 2015.

(51) Int. Cl.
*H04L 27/18* (2006.01)
*H04L 5/00* (2006.01)
*H04B 1/7103* (2011.01)

(52) U.S. Cl.
CPC ...... *H04L 27/2605* (2013.01); *H04L 27/2608* (2013.01); *H04L 27/2613* (2013.01); *H04L 27/2634* (2013.01); *H04B 1/7103* (2013.01)

(58) Field of Classification Search
CPC ... H04L 5/0007; H04L 5/0044; H04L 5/0073; H04L 27/18; H04L 27/2605; H04L 27/2634; H04L 27/3444; H04L 27/3872
USPC ......... 370/252, 329, 335, 350; 375/267, 299
See application file for complete search history.

(56) References Cited

U.S. PATENT DOCUMENTS

| | | |
|---|---|---|
| 8,891,592 B1 | 11/2014 | Zhang et al. |
| 9,332,514 B2 | 5/2016 | Sorin |
| 2001/0044278 A1 | 11/2001 | Chiao et al. |
| 2005/0111401 A1 | 5/2005 | Terry |
| 2007/0168841 A1 | 7/2007 | Lakkis |
| 2009/0103648 A1* | 4/2009 | Fukuoka ............... H04L 5/0044 375/267 |
| 2009/0110031 A1 | 4/2009 | Lakkis |
| 2010/0054223 A1 | 3/2010 | Zhang et al. |
| 2011/0110454 A1 | 5/2011 | Sampath et al. |
| 2011/0122795 A1 | 5/2011 | Hwang et al. |
| 2011/0209035 A1 | 8/2011 | Lakkis |
| 2012/0214403 A1 | 8/2012 | Shany et al. |
| 2014/0105121 A1* | 4/2014 | Jose ...................... H04L 5/0073 370/329 |
| 2014/0206279 A1 | 7/2014 | Immendorf et al. |
| 2015/0043522 A1 | 2/2015 | Mobasher et al. |
| 2015/0237178 A1 | 8/2015 | Zhang |
| 2015/0303959 A1 | 10/2015 | Chen |
| 2016/0241425 A1 | 8/2016 | Xin |
| 2016/0308635 A1 | 10/2016 | Zhou |
| 2016/0381565 A1 | 12/2016 | Oteri |
| 2017/0105229 A1 | 4/2017 | Luo et al. |

* cited by examiner

SYMBOL PHASE ADJUSTMENT FOR WIRELESS COMMUNICATION NETWORKS

RELATED APPLICATIONS

This patent application claims priority to U.S. Provisional Patent Application 62/582,444 filed Nov. 7, 2017, and this patent application is a CIP (continuation-in-part) of U.S. patent application Ser. No. 15/382,685, filed Dec. 18, 2016, which claims priority to U.S. Provisional Patent Application 62/273,993 filed Dec. 31, 2015, and which is a CIP (continuation-in-part) of U.S. patent application Ser. No. 15/248,297, filed Aug. 26, 2016, and a CIP (continuation-in-part) of U.S. patent application Ser. No. 15/248,378, filed Aug. 26, 2016, all of which are herein incorporated by reference.

TECHNICAL FIELD

The present disclosure relates generally to wireless communication networks and in particular to methods of minimizing the detection of interfering packets in a wireless communication network.

BACKGROUND

Most Internet Protocol (IP) traffic is carried on fiber optic or cable networks. This works well when the cable infrastructure is already present or can be easily installed. However, there are many locations where it is either not practical or too expensive to dig up streets or run cables overhead. To alleviate this problem, wireless networks have been proposed to extend the reach of the communication network to locations that cannot be connected by physical cables. Moreover, wireless networks are generally much easier to reconfigure, e.g. to handle changes in data communication traffic.

In some wireless networks that have multiple protocol receivers, a data communications protocol can identify intended receivers. However, other protocols do not provide a capability to target a particular receiver. When no targeting is available, some receivers may miss some packets because they are listening to packets directed at other receivers.

SUMMARY

An embodiment includes a wireless network. The wireless network includes a plurality wireless nodes, wherein the plurality of wireless nodes communicate with each other through a plurality of wireless links, and wherein each wireless link of the plurality of nodes is assigned a specific symbol phase rotation based on a classification of the wireless link. Each of the nodes includes a transceiver, an antenna, a processor; and memory. The memory operates to store program instructions that are executable by the processor to construct a packet including data that is to be transmitted to a receiving node in the wireless network through a specific wireless link of the plurality of wireless links, wherein the constructed packet includes a plurality of symbols. Constructing the packet for transmission over the specific wireless link comprises the program instruction executing the processor to retrieve a specific symbol phase rotation based on the specific wireless link over which the plurality of symbols are to be transmitted over, rotate a phase of each successive symbol of the plurality of symbols based on the specific symbol phase rotation of the specific wireless link, and based on a position of the symbol within the packet, control transmission by the transceiver through the antenna the constructed packet after the phase of each successive symbol of the plurality of data symbols have been rotated.

An embodiment includes a method. The method includes communicating, by a plurality wireless nodes, with each other through a plurality of wireless links, and wherein each wireless link of the plurality of nodes is assigned a specific symbol phase rotation based on a classification of the wireless link, constructing, by a node, a packet including data that is to be transmitted to a receiving node in the wireless network, wherein the constructed packet includes a plurality of symbols, retrieving the specific symbol phase rotation based on the classification of the specific wireless link over which the plurality of symbols are to be transmitted over, rotating a phase of each successive symbol of the plurality of symbols based on the specific symbol phase rotation of the specific wireless link, and based on a position of the symbol within the packet, and controlling transmission by node through an antenna of the node the constructed packet after the phase of each successive symbol of the plurality of data symbols have been rotated by the specific symbol phase rotation.

An embodiment includes a node. The node includes a transceiver, an antenna, a processor and memory. The memory operates to store program instructions that are executable by the processor to construct a packet including data that is to be transmitted to a receiving node in a wireless network, wherein the constructed packet includes a plurality of symbols. Constructing the packet for transmission over a specific wireless link comprises the program instruction executing the processor to retrieve the specific symbol phase rotation based on the classification of the specific wireless link over which the plurality of symbols are to be transmitted over, rotate a phase of each successive symbol of the plurality of symbols based on the specific symbol phase rotation of the specific wireless link, and based on a position of the symbol within the packet, and control transmission by the transceiver through the antenna the constructed packet after the phase of each successive symbol of the plurality of data symbols have been rotated by the specific symbol phase rotation.

DETAILED DESCRIPTION

Embodiments introduced herein improve the detection of packets in a wireless communication network. In some embodiments, packets that are transmitted on the network include a training field that a receiver uses to synchronize itself to an incoming packet. To mitigate a receiver from locking on to the training field of an interfering packet, symbols of the packets are rotated according to a transceiver index.

In some embodiments, transmission times in the network are limited to a number of micro-slots in a time division duplex (TDD) or time division multiplex (TDM) frame. Tightly controlling the transmission times limits the maximum time difference of when an interfering and a desired packet can reach a receiving node.

In some embodiments, one or more portions of a packet, such as the short training field or header field of the packet, are encoded in a manner that is specific to an intended receiver. In some embodiments, packets are transmitted on a frequency that is specific to an intended receiver.

Figure 1:
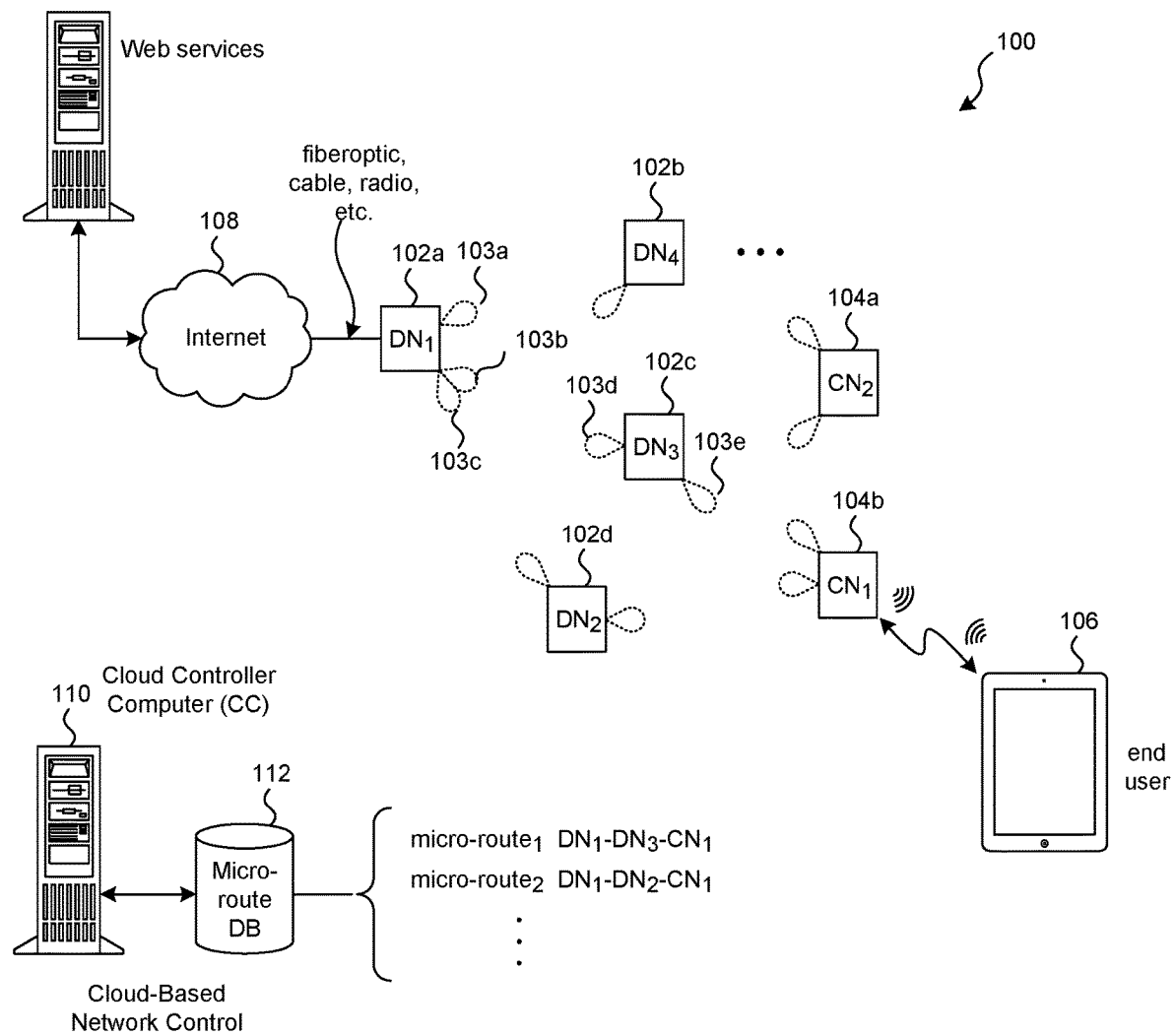
FIG. 1 is a block diagram illustrative of a wireless communication network, according to an embodiment.

FIG. 1 shows one embodiment of a wireless communication network, according to an embodiment. The network 100 includes a number of destination nodes (DN) 102a, 102b, 102c, 102d, etc., and a number of client nodes (CN) 104a, 104b, etc. The destination nodes transmit IP packets between themselves and the client nodes. Each node includes one or more antennas, a radio frequency transceiver for sending and receiving signals and a beamformer (for example, an array of antennas that are directionally controlled) for selectively changing the effective transmit and receive directions of the signals transmitted and received. The nodes also include one or more processors that execute programmed instructions to transmit packets between the nodes or to and from a computer communication link. The client nodes transmit and receive IP packets between themselves and the destination nodes as well as to a number of end users 106 (including, but not limited to, wireless enabled devices such as computers, tablets, smart phones, household appliances, or any other device capable of transmitting and receiving wireless IP data). For at least some embodiments, the destination nodes 102 are mounted on utility poles or on buildings and transmit point-to-point wireless signals approximately 200-300 meters, depending on the conditions. The client nodes 104 are generally located in retail/office establishments or in homes to transmit and receive IP packets to and from the end users. In some embodiments, the IP packets are sent according to a standardized protocol such as IEEE 802.11ad. However, it will be appreciated that any number of other IP protocols, such as WiMAX 802.16, could be used.

In the network 100, at least one destination node (e.g., node 102a) is coupled to a physical cable that carries IP data to and from a computer communication link 108 (e.g., the Internet or a private communication link). IP packets that are destined for an end user 106 are received from the communication link and are transmitted via one or more routes to the client node 104b, which is in communication with the end user 106. For example, packets may be sent via a route including nodes $DN_1 \rightarrow DN_3 \rightarrow CN_1$ or via a second route including nodes $DN_1 \rightarrow DN_2 \rightarrow CN_1$, depending on the radio frequency path conditions that may exist at any time.

In some embodiments, transmissions are carried on a non-regulated 60 GHz radio frequency spectrum band. At these frequencies, the ability to transmit and receive packets is easily influenced by changing atmospheric conditions (wind, rain, etc.) or by interfering objects (e.g., buses, tree limbs, or other objects passing in and out of the line of sight). Therefore, the best route to complete a communication link between a transmitting and a receiving node in the network may change over time.

In the embodiment shown, a cloud controller computer 110 includes a database 112 that stores a list of possible routes that have been determined to complete a communication link between the various nodes of the network. The cloud controller computer 110 can communicate with each of the nodes by sending packets that are addressed to the nodes to control the overall operation of the network. In some embodiments, the cloud controller computer 110 periodically updates the list of possible routes based on information received from the various nodes in the system regarding channel conditions.

To improve the communication path between each of the nodes, to reduce interference, and to increase the throughput of the network, the destination and client nodes generally include multiple antennas that can be used to control the transmit and receive directions of the node by employing beamforming techniques. As will be appreciated by those skilled in the art of radio frequency communications, the radio frequency signals transmitted by each of the antennas can be selectively timed by beamforming techniques to direct the main lobe (which can comprise the bulk of the transmitted signal power) in a desired direction. Similarly, signals received by the antennas can be delayed and summed using beamforming techniques to change the effective listening direction of the receiver. In the embodiment shown in FIG. 1, destination node $DN_1$ 102a can beamform its transmitted and received signals in several different directions 103a, 103b, 103c. Similarly, destination node $DN_3$ 102c can beamform its transmitted and received signals in directions 103d and 103e.

In some embodiments, a node will receive more than one packet at a time. The presence of interfering packets inhibits the ability of a node to accurately decode a desired packet. This problem is particularly acute in time domain duplex or time domain multiplex point-to-point wireless networks where a common "training field" precedes each packet. In this case, the training field does not uniquely identify the intended receiver, and it is possible that an unintended receiver will lock on to an interfering packet and miss a desired packet. Therefore, there is a need for a system that increases the ability of a node to detect a desired packet in the presence of interference.

Figure 2A:
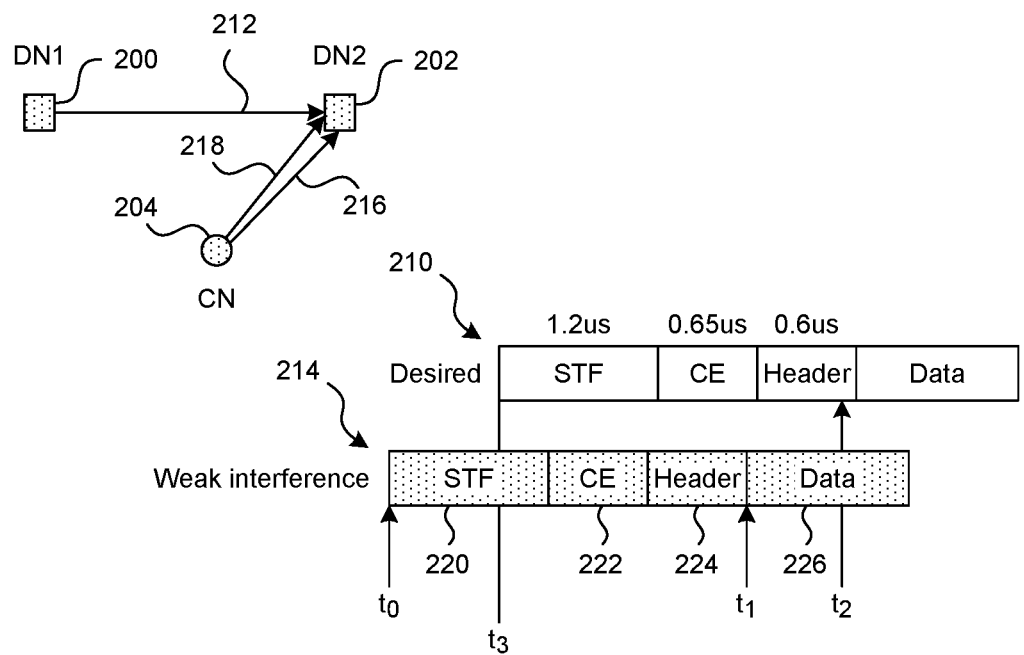
FIG. 2A is a block diagram illustrative of a node that receives a desired packet and an interfering packet, according to an embodiment.

As discussed above, interfering packets that arrive at a receiving node at nearly the same time as a desired packet inhibit the ability of the receiving node to accurately decode the desired packet. This reduces throughput on the network because signals have to be sent indicating that the desired packet was not received and the missed packet has to be retransmitted. FIG. 2A shows a portion of a communication network including two destination nodes 200, 202 and a client node 204. Each of the nodes includes multiple antenna arrays (not shown) so that the nodes can simultaneously transmit or receive packets in different directions. In this example, destination node 200 sends a desired packet 210 in a direction 212 to a first antenna array used by the destination node 202. At nearly the same time, client node 204 sends a packet 214 in a direction 216 to another antenna array used by the destination node 202. In the example shown, the packet 214 sent from client node 204 also travels in a path 218 so that it arrives at the node 202 before the desired packet 210. Because the antenna array on destination node 202 is not tuned to listen in the direction 218, the packet 214 has a weaker signal power than the signal power of the desired packet 210.

Like other packets transmitted on the network, the interfering packet 214 begins with a short training field (STF) 220, is followed by a channel evaluation (CE) field 222 and a header field 224, and ends with a data portion 226 of the packet. The interfering packet 214 is received at time $t_0$ by an antenna array for the node 202 that is listening in the direction 212. Because the interfering packet 214 arrives at $t_0$ before the desired packet 210 at $t_3$, the receiver in node 202 attempts to lock on to and decode the interfering packet 214. Due to the presence of the stronger desired packet 210 that arrives later, the receiver is unable to decode the header portion of the interfering packet 214 at time $t_1$ or the data portion of the interfering packet at time $t_2$. However, by the time the receiver in node 202 determines that it cannot decode the header field of the interfering packet 214, the short training field of the desired packet 210 has already been transmitted. Therefore, the receiver is also unable to lock on to and decode the desired packet 210.

Figure 2B:
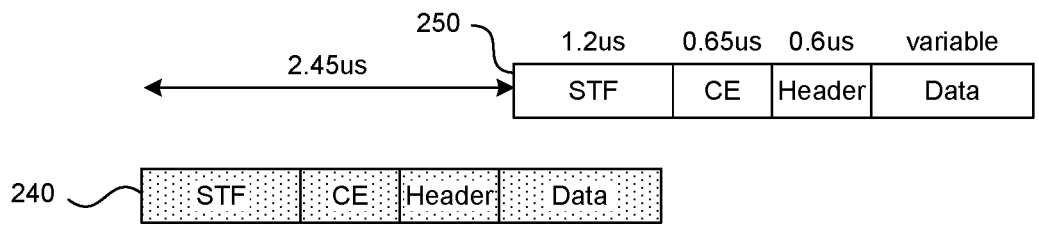
FIG. 2B is a block diagram illustrative of a time period during which a receiving node cannot decode a desired packet in the presence of an interfering packet.

In some cases, if an interfering packet arrives much earlier than the desired packet, the receiving node will be able to determine that it cannot decode the interfering packet and still have time to detect and decode the desired packet. FIG. 2B shows an example of this situation. Here, an interfering packet 240 arrives at the receiving node before a desired packet 250. By the time the receiving node determines that it cannot decode the header portion of the interfering packet, the short training field of the desired packet 250 is just arriving. Even if the receiving node misses a few samples of the STF of the desired packet 250, the receiving node should be able to lock on to the desired packet and decode it. On the other hand, if the interfering packet arrives just before the desired packet (e.g., the interfering packet arrives before the desired packet by an amount that is less than the duration of the STF), the receiver will likely be able to lock on to and decode the STF of the stronger packet. Therefore, there is a time window during which the interfering packet has the greatest potential to prevent the receiver from being able to detect and decode a desired packet.

Figure 3:
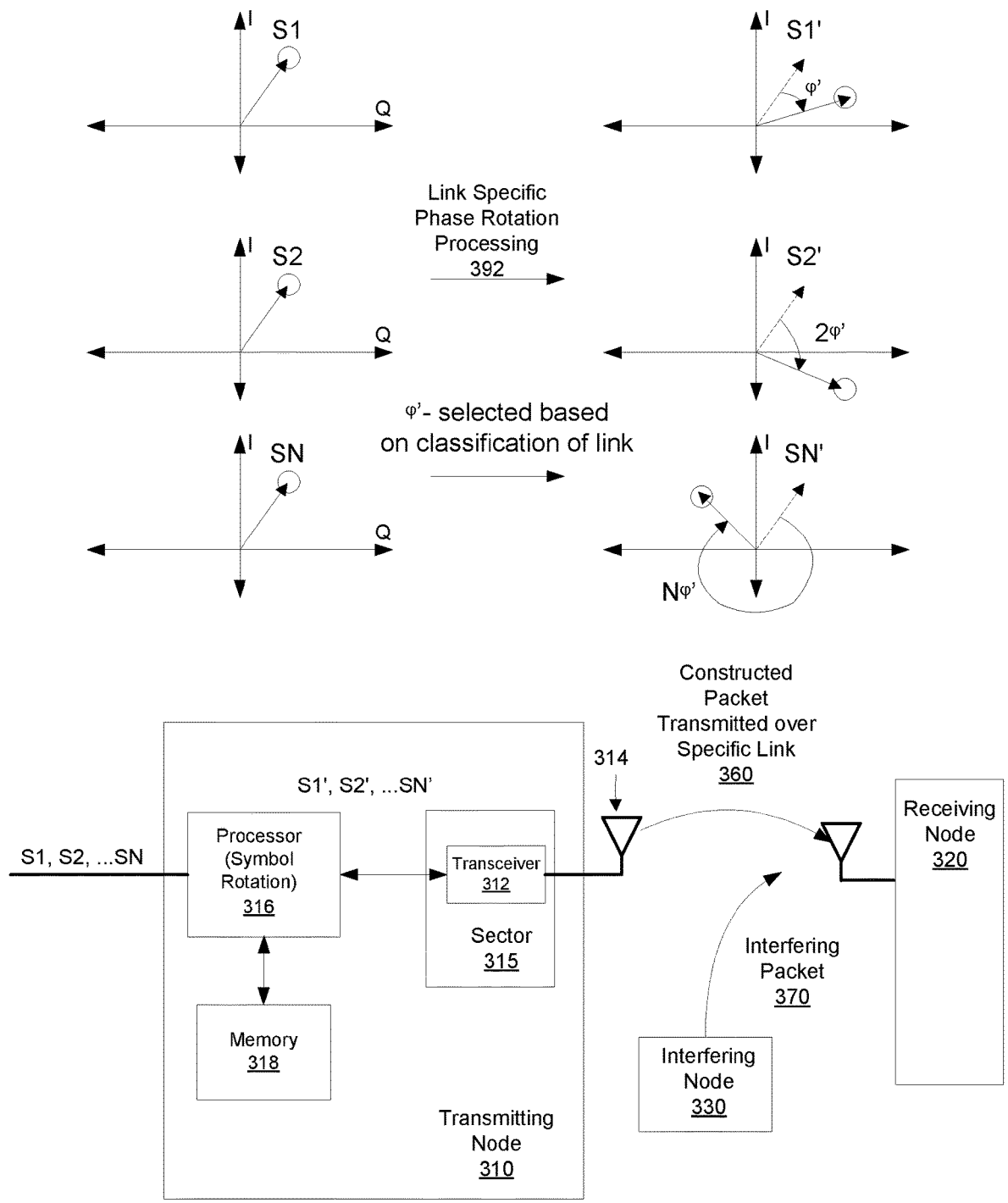
FIG. 3 shows a transmitting node and a receiving node that include symbol phase adjustments at the transmitting node, according to an embodiment.

FIG. 3 shows a transmitting node 310 and a receiving node 320 that include symbol phase adjustments at the transmitting node 310, according to an embodiment. The transmitting node includes a transceiver 312, an antenna 314, a processor 316 and a memory 318. For an embodiment, a sector 315 includes the transceiver 312. For at least some embodiments, the transmitting node 310 and/or the receiving node 320 includes one or more sectors, wherein each sector includes a radio (transceiver)). For an embodiment, the memory 318 stores program instructions, wherein the program instructions are executable by the processor 316 to construct a packet including data that is to be transmitted to the receiving node 320 in the wireless network, wherein the constructed packet including data that is to be transmitted to the receiving node 320 through a specific wireless link 360 of a plurality of wireless links, wherein the constructed packet includes a plurality of symbols. For an embodiment, constructing the packet for transmission over the specific wireless link includes the program instruction executing the processor 316 to retrieve a specific symbol phase rotation based on, for example, a classification of the specific wireless link 360 over which the plurality of symbols are to be transmitted over, and rotate a phase of each successive symbol of the plurality of symbols based on the specific symbol phase rotation of the specific wireless link 360, and based on a position of the symbol within the packet. The rotated phase of the symbols of the constructed packet mitigates early packet interference from, for example, and interfering packet 370 from an interfering node 330.

For an embodiment, a specific wireless link is determined based on the specific receiving node of the transmitting node. That is, a first specific wireless link is defined or determined by the transmitting node wirelessly communicating with a first receiving node, and a second specific wireless link is defined or determined by the transmitting node wireless communicating with a second receiving node. Further, other specific wireless links can be defined or determined by other transmitting nodes wirelessly communicating with other receiving nodes.

For at least some embodiments, after digital signal processing of a signal stream S1, S2, SN within the processor 316, the symbols S1, S2, SN are rotated by: $e^{(1i*pi/2*n)}$ where n is, for example, a transmitter sample index. For this embodiment, each symbol included within the constructed packet is delayed by an amount that is dependent on the transmitter sample index.

Further, as described, for at least some embodiments, the phase of each successive symbol of the plurality of symbols is rotated by a specific symbol phase rotation of the specific wireless link, and based on a position of the symbol within the packet that includes the successive symbols. That is, for this embodiment, the symbols are rotated by:

$e^{(1i*pi*D/8*k)}$ where D is a symbol number and k is the specific symbol phase rotation.

For this embodiment, each symbol included within the constructed packet is delayed by an amount that is dependent on the position of the symbol within the packet, and the specific wireless link that packet is to be transmitted through. That is, for this embodiment, each successive symbol within the packet is delayed by a greater amount, wherein the amount is based on the specific symbol phase rotation of the specific wireless link, and based on a position of the symbol within the packet. For an embodiment, the packet includes a plurality of successive symbols, wherein each symbol position occurs just after the previous symbol position in time. The packet includes a finite number of successively placed symbols. As will be described, the delay of each successive symbol does not necessarily have to be greater, just different. Further, the phase rotation from symbol to symbol does not necessarily have to change by the same amount.

Accordingly, as shown in FIG. 3, for an embodiment, link specific phase rotation processing 392 includes a first symbol S1 being rotated by a phase φ where the φ is selected based upon the specific link 360 between the transmitter 310 and the receiver 320, yielding a rotated symbol S1' for transmission through the specific link 360. Further, as shown, a second symbol S2 is rotated by a phase 2φ where the φ is selected based upon the specific link 360 between the transmitter 310 and the receiver 320, yielding a rotated symbol S2' for transmission through the specific link 360.

Further, as shown, an Nth symbol SN is rotated by a phase Nφ where the φ is selected based upon the specific link 360 between the transmitter 310 and the receiver 320, yielding a rotated symbol SN' for transmission through the specific link 360. For an embodiment, the rotated phase of each successive symbol changes with time. For an embodiment, the rotated phase of each successive symbol increases with time. While the symbols S1, S2, SN are shown as having approximately the same initial phase, it is to be understood that the illustrated phases are merely by example.

While the rotated phase of each successive symbol is shown in FIG. 3 as increasing with each successive symbol, it is to be understood that for at least one embodiment the phase of each symbol successive symbol changes (increase or decrease). The change in the rotated phase of the successive symbols is preselected, and the successive changes of the successive symbol are based upon the specific link that the packet of the symbols is being transmitted through. That is, for an embodiment, a preselected order of the rotation of the phase of each successive symbol is preselected based upon the specific link that the packet of the symbols is to be transmitted through. Different links can have different preselected ordering of the rotated phase of each of the successive symbols of the packet.

The receiver of the packet uses the preselected ordering of the rotation of the phases of the symbols to "de-rotate" the symbols upon reception of the packet of symbols. The de-rotation of the symbols may also be referred to as reciprocally rotating a phase of each successive received symbol of the plurality of data symbols based on the specific symbol phase rotation of the specific wireless link, and based on the position of the symbol within the received packet.

As will be described, the selection of the specific symbol phase rotation φ is dependent upon the wireless link the successive symbols are to be transmitted through to the receiving node. For an embodiment, different wireless links of the wireless network that are classified differently are assigned a different specific symbol phase rotation. The classifications can be by link, by node, or can include multiple nodes. The specific symbol phase rotation is wireless link specific. Each wireless link defines a wireless connection between the node and a specific other node which defines the specific wireless link. Each specific wireless link has a specific symbol phase rotation which is applied to sequences of symbols transmitted through the specific wireless link. As described, each link may have its own specific symbol phase rotation, or multiple wireless links may share a specific symbol phase rotation. For an embodiment, the classification of the wireless link determines how the specific symbol phase rotations are shared amongst the wireless links of the nodes of the wireless network.

For an embodiment, each of the wireless links are classified as belonging to one of a plurality of groups of wireless links, wherein the specific symbol phase rotation of the wireless link is determined by which group of the plurality of groups the wireless link belongs to. For an embodiment, each of the plurality of groups of wireless links includes a single wireless link.

For an embodiment, one or more of the plurality of groups of wireless lines includes a plurality of wireless links. For an embodiment, the plurality of wireless links are each assigned to a group of the plurality of groups of wireless links based on based on connectivity of the wireless links between the nodes of the wireless network.

For an embodiment, wireless links of each node are assigned to a same group of the plurality of groups. That is, streams of symbols transmitted over the different links of the node have the phase of each successive symbol rotated equivalently.

For an embodiment, wireless links of a plurality of nodes are assigned to a same group of the plurality of groups based on the connectivity of the wireless links between the plurality of nodes of the wireless network.

For an embodiment, interference is characterized between at least one wireless link of a first group of the plurality of groups and at least one wireless link of a second group of the plurality of groups, wherein at least one of the first group or the second group includes the specific wireless link, and wherein the specific symbol phase rotation is assigned to the first group a second specific symbol phase rotation is assigned to the second group based on the characterizing of the interference.

Figure 4:
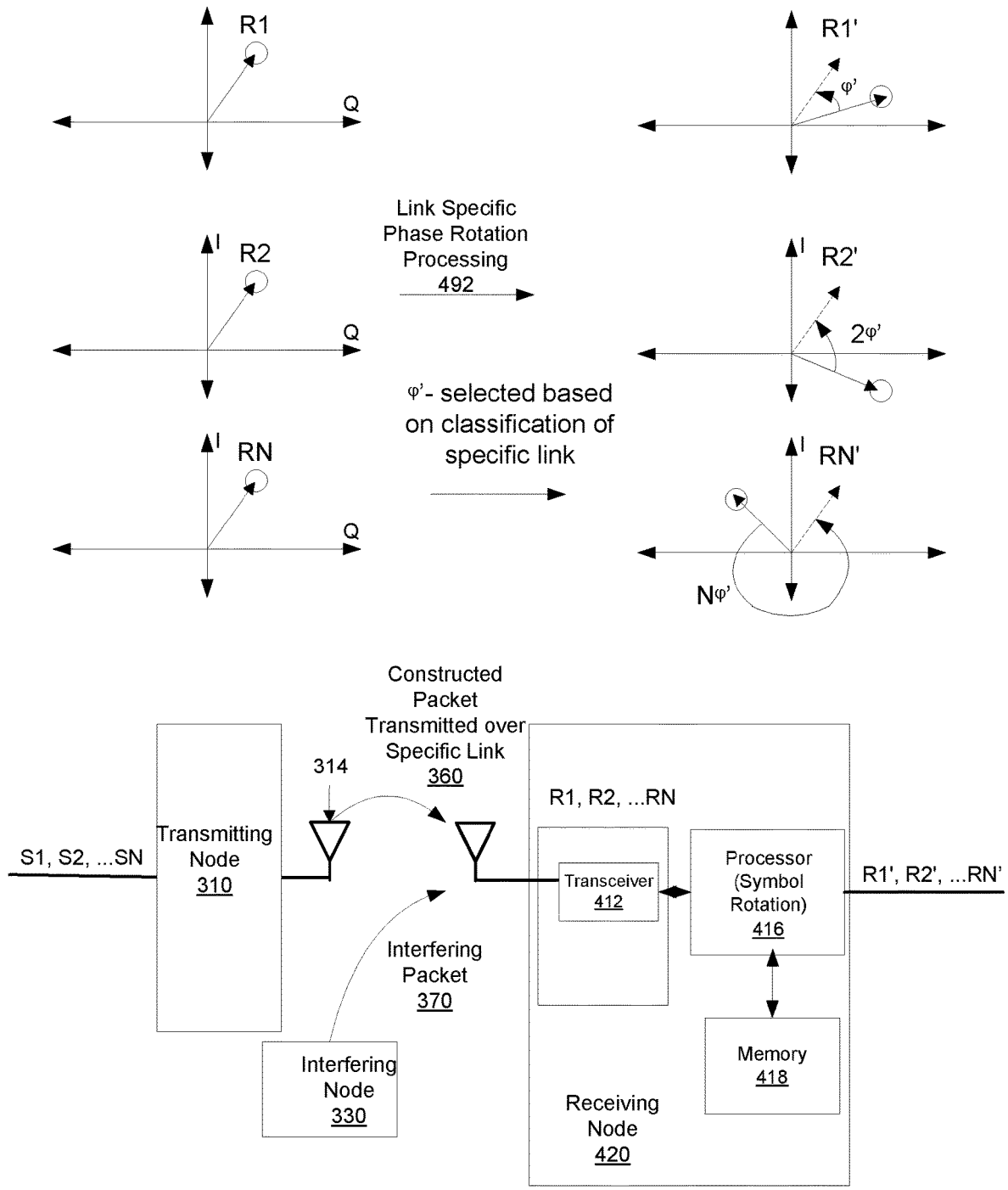
FIG. 4 shows a transmitting node and a receiving node that include symbol phase adjustments and the receiving node, according to an embodiment.

FIG. 4 shows a transmitting node 310 and a receiving node 420 that include symbol phase adjustments at the receiving node 420, according to an embodiment. For an embodiment, the receiving node 420 operates to receive the constructed packet through the specific wireless link 360, and reciprocally rotate a phase of each successive received symbol of the plurality of data symbols by the specific symbol phase rotation of the specific wireless link 360. The reciprocal rotation includes rotating the symbols back to the way they were before being rotated by the transmitting node. That is, for example, if S1 is rotated by φ, then the same symbol after being transmitted, propagated over the specific link 360, and received by the receiving node 420, is phase rotated by −φ. That is, the symbol R1 is rotated by −φ yielding the phase rotated symbol R1'.

As shown, the receiving node 420 includes a transceiver 412 that receives symbols R1, R2, . . . RN that have propagated through the specific wireless link 360 from the transmitting node 310. Further, the receiving node 420 rotates the received symbols R1, R2, . . . RN within, for example, a processor 416 (and memory 418), yielding phase rotated received symbols R1', R2', . . . RN'. For an embodiment, the specific symbol phase rotation φ is selected based on the specific wireless link 360 the received symbols R1, R2, . . . RN propagated through.

As shown, for link specific phase rotation processing 492, a first received symbol R1 is rotated by the specific symbol phase rotation −φ. Further, a second received symbol R2 is rotated by a phase of −2φ, and an Nth received symbol RN is rotated by −Nφ. For an embodiment, the rotated phase of each successive symbol changes with time. For an embodiment, the rotated phase of each successive symbol decreases with time.

Figure 5:
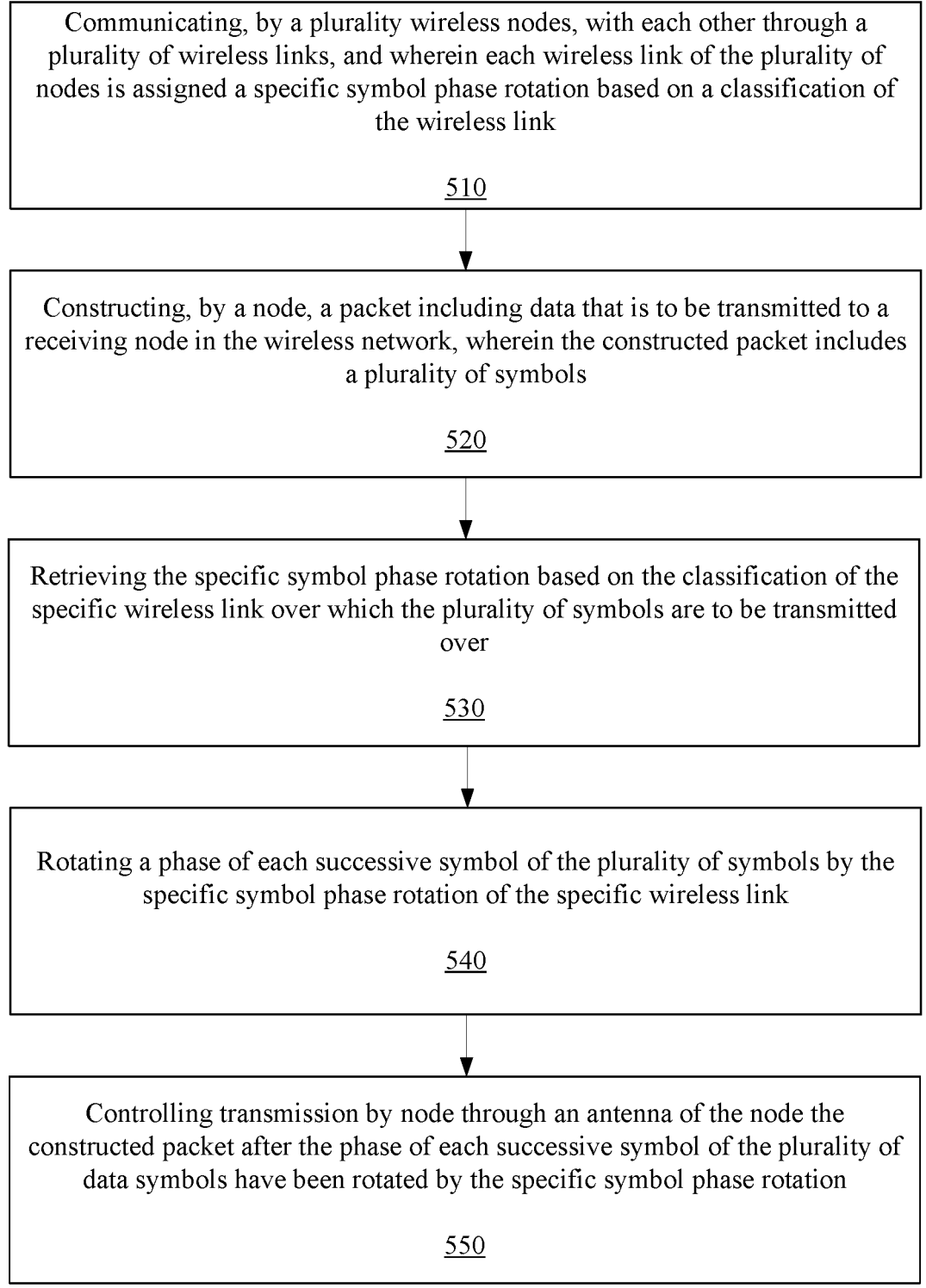
FIG. 5 is a flow chart that includes acts of a method of phase adjustment of symbols transmitted through a specific wireless link, according to an embodiment.

FIG. 5 is a flow chart that includes acts of a method for use in a wireless communication network, according to an embodiment. A first act 510 includes communicating, by a plurality wireless nodes, with each other through a plurality of wireless links, and wherein each wireless link of the plurality of nodes is assigned a specific symbol phase rotation based on a classification of the wireless link. A second act 520 includes constructing, by a node, a packet including data that is to be transmitted to a receiving node in the wireless network, wherein the constructed packet includes a plurality of symbols. A third act 530 includes retrieving the specific symbol phase rotation based on the classification of the specific wireless link over which the plurality of symbols is to be transmitted over. A fourth act 540 includes rotating a phase of each successive symbol of the plurality of symbols by the specific symbol phase rotation of the specific wireless link. For an embodiment, the rotated phase of each successive symbol changes with time. For an embodiment, the rotated phase of each successive symbol increases with time. A fifth act 550 includes controlling transmission by node through an antenna of the node the constructed packet after the phase of each successive symbol of the plurality of data symbols have been rotated by the specific symbol phase rotation. As previously described, for an embodiment, a different specific symbol phase rotation is applied to symbols that are to be transmitted through wireless links that are classified differently.

As previously described, an embodiment includes classifying each of the wireless links as belonging to one of a plurality of groups of wireless links, and wherein the specific symbol phase rotation of the wireless link is determined by which group of the plurality of groups the wireless link belongs to. For an embodiment, each of the plurality of groups of wireless links includes a single wireless link. For an embodiment, one or more of the plurality of groups of wireless lines includes a plurality of wireless links.

An embodiment includes assigning each of the plurality of wireless links to a group of the plurality of groups of wireless links based on based on connectivity of the wireless links between the nodes of the wireless network. For an embodiment, wireless links of each node are assigned to a same group of the plurality of groups. For an embodiment, wireless links of a plurality of nodes are assigned to a same group of the plurality of groups based on the connectivity of the wireless links between the plurality of nodes of the wireless network.

At least some embodiments include characterizing interference between at least one wireless link of a first group of the plurality of groups and at least one wireless link of a second group of the plurality of groups, wherein at least one of the first group or the second group includes the specific wireless link, and assigning the specific symbol phase rotation to the first group and assigning a second specific symbol phase rotation to the second group based on the characterizing of the interference.

As previously described, at least some embodiments include receiving, by a receiving node, the constructed packet through the specific wireless link, and reciprocally rotating a phase of each successive received symbol of the plurality of data symbols by the specific symbol phase rotation of the specific wireless link.

Figure 6A:
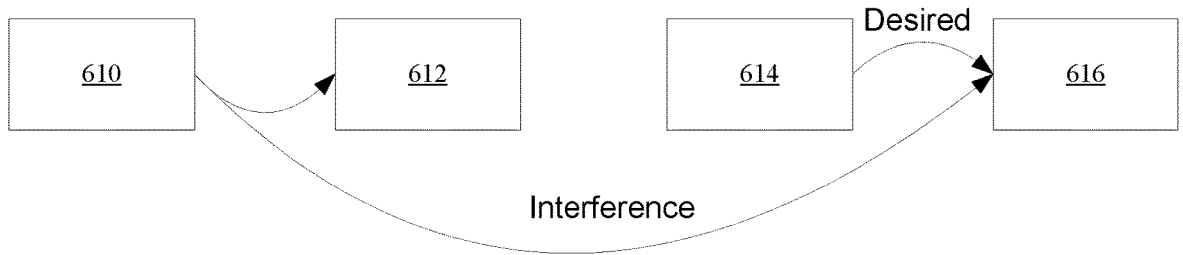
FIGS. 6A, 6B, 6C shows node configurations that can result in packet interference between links of a wireless network, according to some embodiments.
Figure 6B:
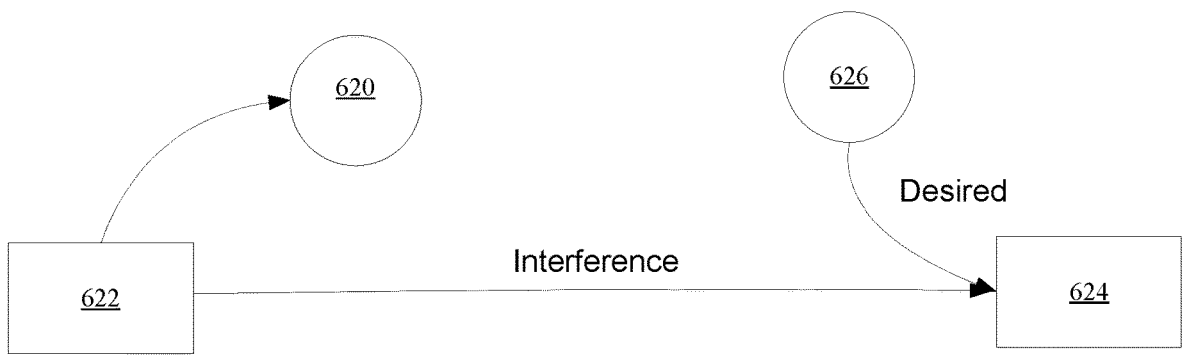
Figure 6C:
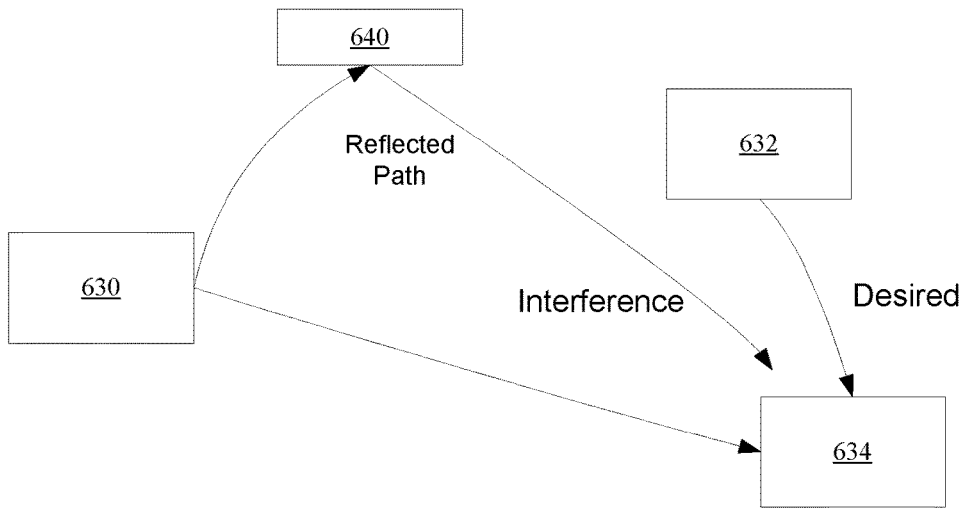

FIGS. 6A, 6B, 6C shows node configurations of a wireless network that can result in packet interference between links of the wireless network, according to some embodiments. FIG. 6A shows wireless nodes 610, 612, 614, 616 of the wireless network. Wireless node 610 may be wirelessly communicating with node 612. However, due to proximity or other factors, this wireless communication may cause interference with reception at node 616. That is, node 616 may be receiving wireless communication from node 614, but the wireless communication between node 610 and node 612 may interfere with the reception of the wireless communication by node 616.

FIG. 6B shows node 622 wirelessly communicating with client node 620. Further, client node 626 is communicating with node 624. However, the wireless communication between node 622 and client node 620 may interfere with the communication between client node 626 and node 624.

FIG. 6C shows a node 630 wirelessly communicating with a first sector of node 634, and node 632 wirelessly communicating with a second sector of node 634. For at least some embodiments, a node includes multiple sectors, wherein each sector includes at least a transceiver. However, the communication signal emanating from node 630 may reflect off of a reflector 640 and be redirected to interfere with the wireless communication between the node 632 and the second sector of node 634.

As shown, due to the large number of proximate wireless links, multipoint, multi-hop wireless networks are susceptible to interference between links of the wireless network. That is, wireless communication of one link between nodes of the wireless network can interfere with the wireless communication of one or more other link between other nodes of the wireless network.

Figure 7:
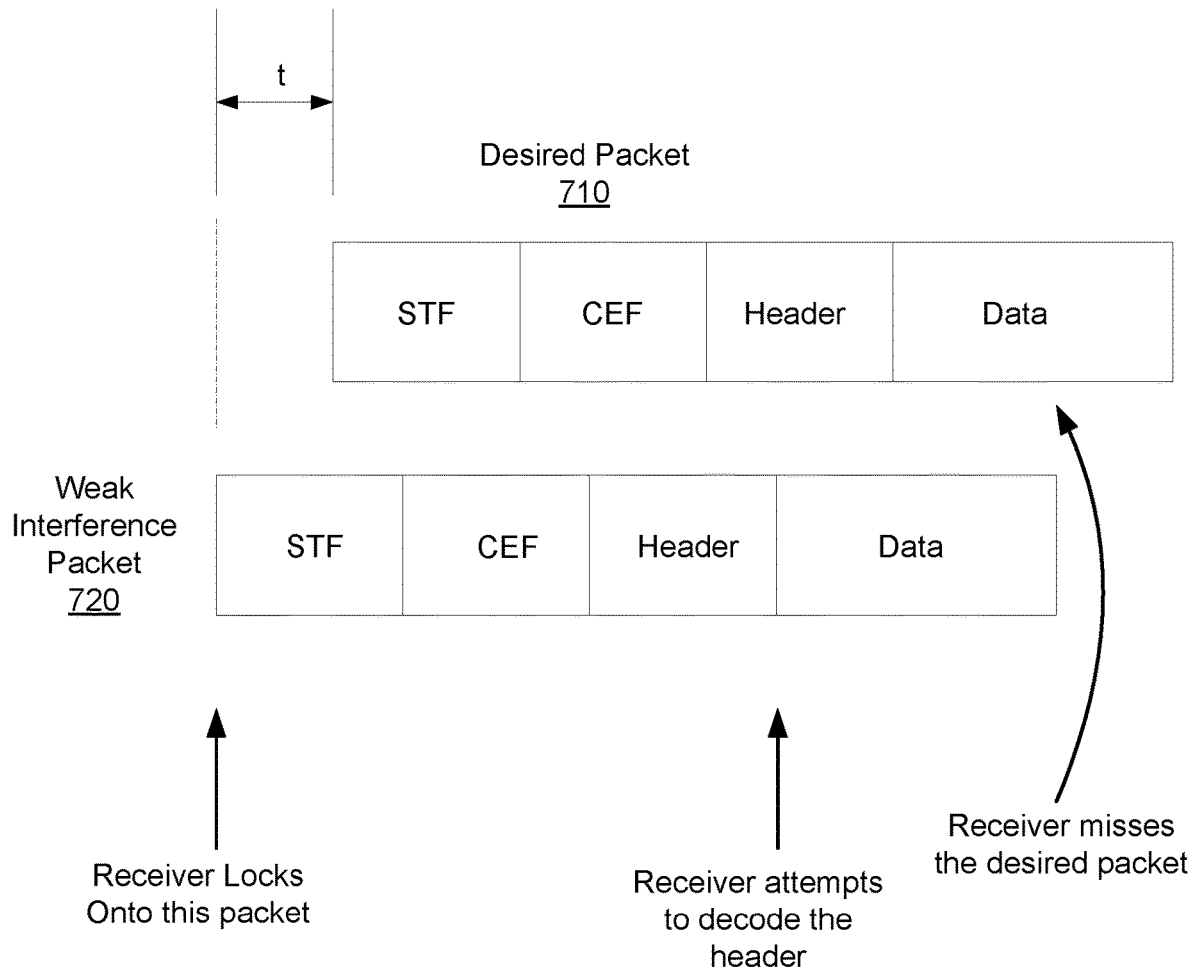
FIG. 7 shows a desired packet and an interfering packet, according to an embodiment.

FIG. 7 shows a desired packet 710 and an interfering packet 720, according to an embodiment. As shown, a receiver of a node of the wireless network can receive an interfering packet 720 before receiving a desired packet 710. The desired packet is an intended or desired packet of wireless communication over a link between the node and a transmitting node. However, due to the existence of other nodes of the wireless network, the node may also receive the interfering packet 720 a time t before receiving the desired packet 710.

The interfering packet 720 is generated by another node of the wireless network. Therefore, the interfering packet may be commonly constructed. For example, for an embodiment, one or more packets of the wireless network include a preamble that includes a short training field (STF) and a channel estimation (CE) field. Further, for an embodiment, the one or more packets further include a header and data.

Upon receiving the interfering packet 720 (also referred to as early weak interference) the receiver of the node may attempt to lock onto the early weak interference packet 720. That is, the early weak interference packet 720 may be similarly constructed as the desired packet 710, but the early weak interference packet 720 is received by the node a time t before receiving the desired packet 710. Therefore, the receiver of the node may misinterpret the early weak interference packet 720 as the desired packet 710, and attempt to lock onto the packet in order to receive and decode the packet. That is, for at least some embodiments, a receiving sector of a node uses the STF to detect the presence of a packet, and thereafter starts the remainder of the packet acquisition process. If the node inadvertently uses the STF of the weak interference signal to detect the presence of the packet, the node may start the remainder of the acquisition process. However, the early weak interference packet 720 is not the desired packet, and while the receiver of the node is attempting to lock onto and decode the early weak interference packet 720, the desired packet may be missed. Clearly this is undesirable.

Figure 8:
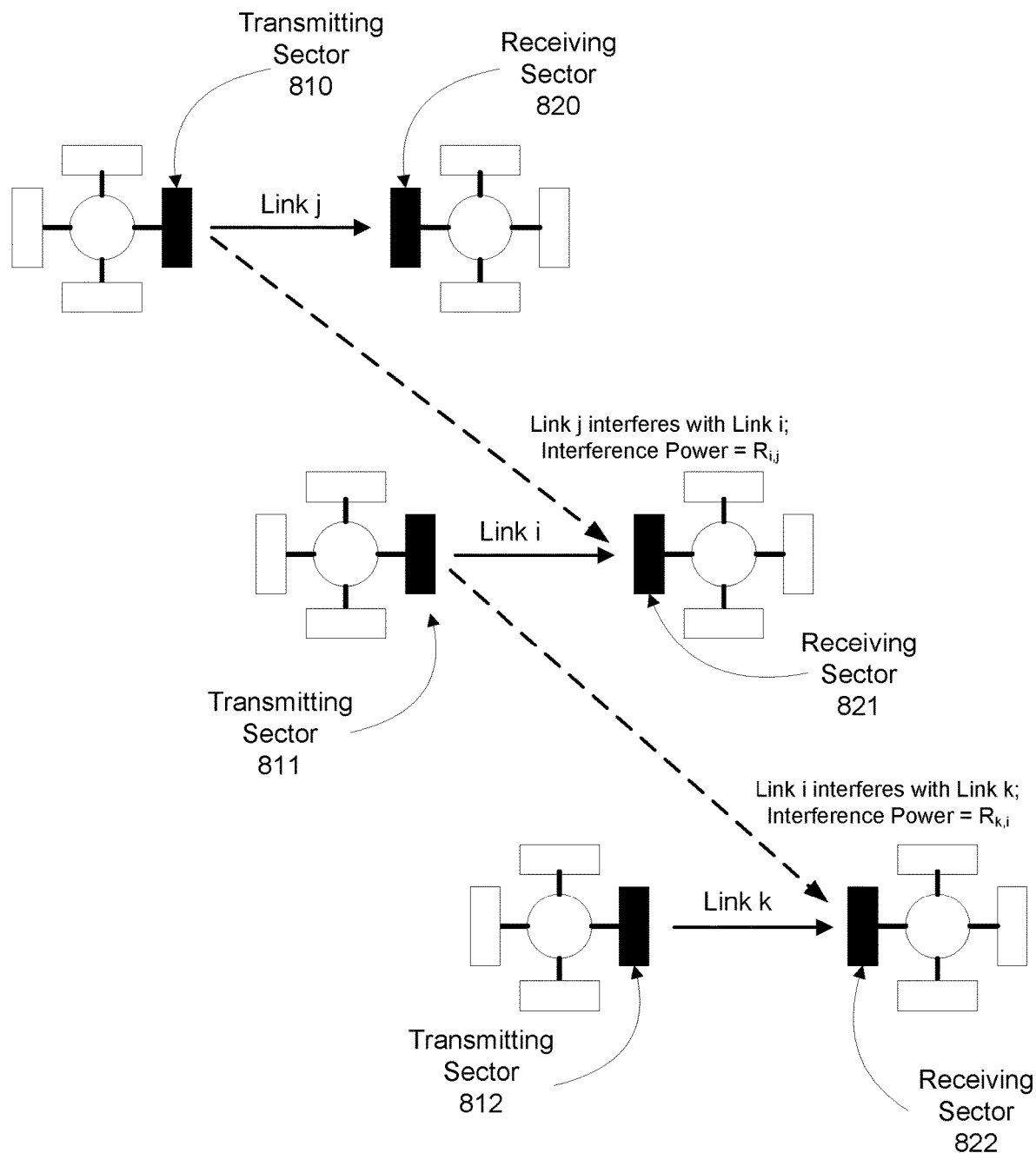
FIG. 8 shows multiple links between transmitting and receiving nodes, and further shows interference between different links, according to an embodiment.

FIG. 8 shows multiple links between transmitting and receiving nodes, and further shows interference between different links, according to an embodiment. At least some embodiments include identifying links of the wireless network that interfere with other wireless links of the wireless network. At least some embodiments include identifying groups of links of the wireless network that interfere with other groups of wireless links of the wireless network.

As shown, a link j is formed between a transmitting sector 810 and a receiving sector 820. Further, a link i is formed between a transmitting sector 811 and a receiving sector 821. Further, a link k is formed between a transmitting sector 812 and a receiving sector 822.

Due to the proximity and relative physical locations of each of the sectors and the links formed between the sectors, at least some of the links will cause interference within other links. The interference can be further influences by reflectors that vary the direction of travel of the wireless communication of the links, and by variations in the directivity of beams formed by multiple antennas of at least some embodiments of the sectors.

For example, the link j may cause at least some interference with the link i which can be represented by an indicator of the interference power $R_{ji}$. Further, the link i may cause at least some interference with the link k which can be represented by an indicator of the interference power $R_{ik}$.

For at least some embodiment, the interfering packets of these interfering link have reference sequences inserted into at least a portion of the preambles of the interfering packets to prevent receivers of victim links (wireless links that suffer from interference due to the interfering links) from attempting to lock onto the interfering packets of the interfering links.

Grouping of Links

Figure 9:
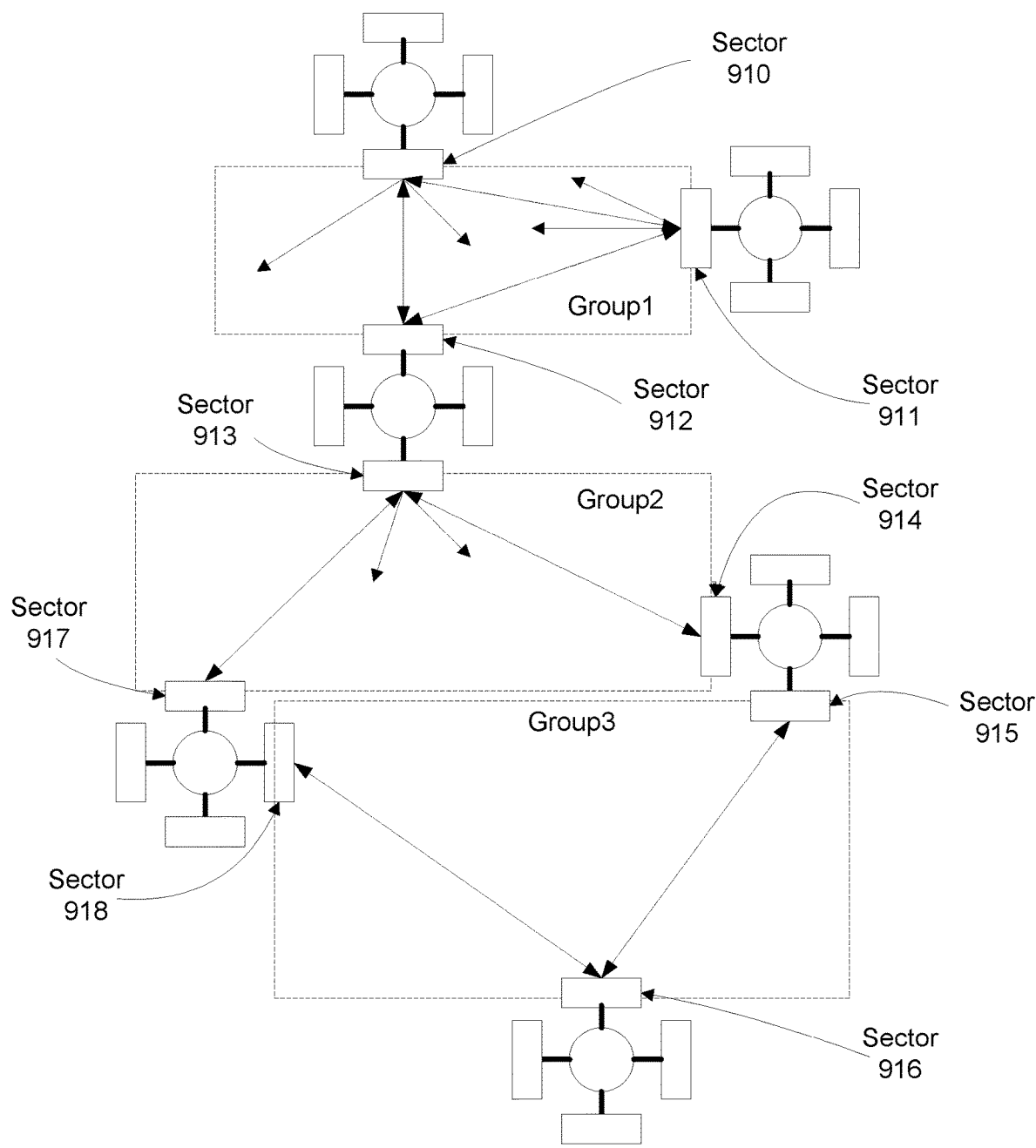
FIG. 9 shows groupings of links, according to an embodiment.

FIG. 9 shows groupings of links, according to an embodiment. As previously described, the effects of packet interference can be mitigated by rotating a phase of a sequence of symbols of the packet communicated through each different link. The number of possible phase adjustments may be limited. For an embodiment, the links are grouped. Once the links are grouped, a group that is determined to include one or more links that interfere with one or more links of another group is specific symbol phase rotation that is different, and uncorrelated with the specific symbol phase rotation of the other group. Sectors associated with the one of more links of a group are assigned the specific symbol phase rotation selected for the group. The sectors then use the specific symbol phase rotation for rotating symbols of packets communication over the specific one or more links of the associated group. For an embodiment, specific symbol phase rotation is used for both transmission and reception of packets by a sector.

For an embodiment, grouping links of a wireless network into a plurality of groups is based on a connectivity of the links between sectors of the wireless network.

FIG. 9 shows groupings of links, according to an embodiment. A first group (Group1) includes links formed between sectors 910, 911, 912. The sectors are each a part of different nodes of the wireless network and include two-way (transmit and receive) communication.

For an embodiment, the links are grouped by the wireless connectivity between communicating sectors. For example, sectors 910, 911, 912 are directly connected (that is, there is a single wireless hop between any two of these sectors), and form a first group (Group1).

A second group (Group2) includes sectors 913, 914, 917 due to the direct connectivity of these sectors. A third group (Group3) includes sectors 915, 916, 918 due to the direct connectivity of these sectors.

As will be described, if one or more of the links of one group interfere with one or more links of another group, the two groups are assigned different specific symbol phase rotation to mitigate interferences between links of the two groups.

Figure 10:
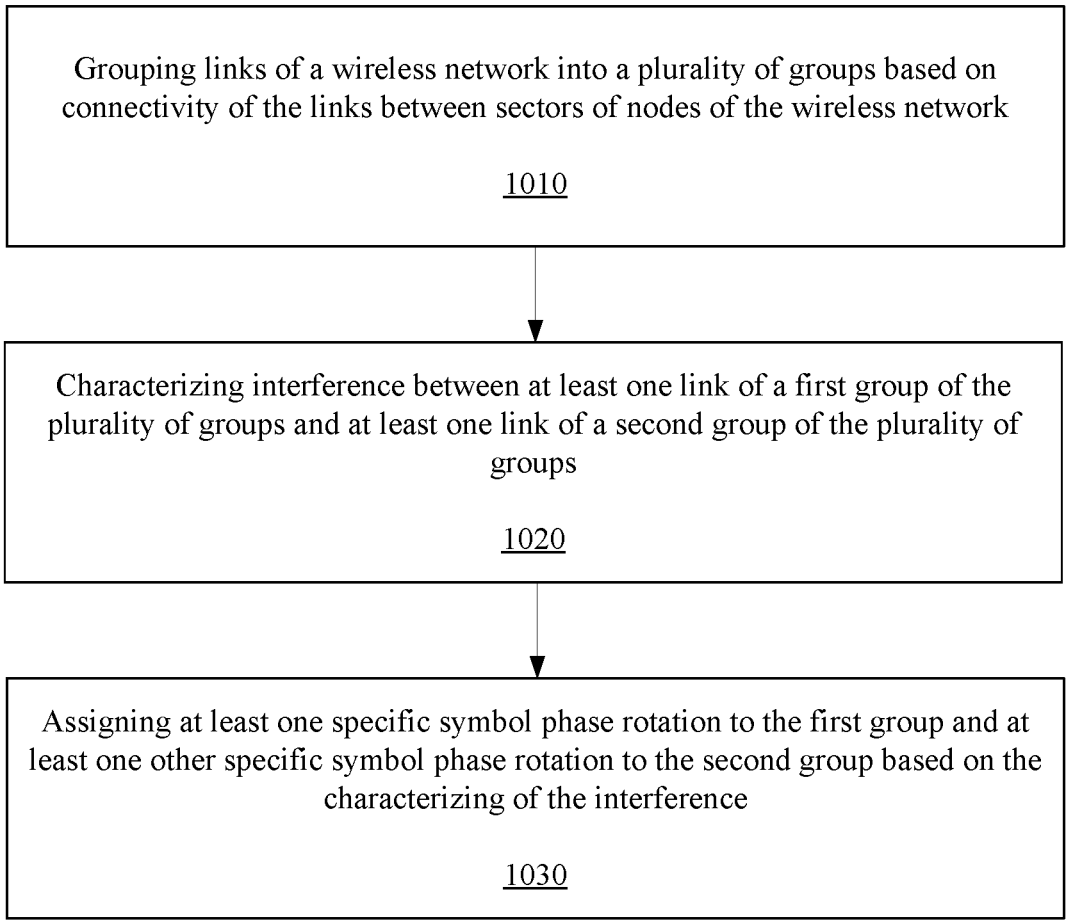
FIG. 10 is a flow chart that includes steps of a method of assigning phase rotations for symbols transmitted through one or more of groups of links, according to an embodiment.

FIG. 10 is a flow chart that includes steps of a method of selecting phase rotations for symbols transmitted through one or more for groups of links, according to an embodiment.

Phase Rotation Selection

For a given system, there is multiple specific symbol phase rotation available for selection. Further, at least some embodiments include at least a minimum number of specific symbol phase rotation. For at least some embodiments, a specific symbol phase rotation is assigned to each of the identified groups. In order to minimize interference between the groups, a minimum number of specific symbol phase rotations for assignment may be desired.

As previously described, for at least some embodiments, grouping links of the wireless network is based on connectivity of the links between sectors of nodes of the wireless network is based upon a topology of the wireless network. For at least some embodiments, grouping links of the wireless network based on connectivity of the links between sectors of nodes of the wireless network includes identifying one or more links between sectors of the wireless network, and grouping the one or more links.

Characterizing Interference

For at least some embodiments, characterizing the interference includes generating an interference matrix wherein each entry of the interference matrix includes at least one indicator of interference of an ith group on a jth group. More specifically, for an embodiment, characterizing the interference includes generating an interference matrix wherein each entry of the interference matrix includes the at least one indicator of interference of an ith group on a jth group of the wireless network. Once created, the interference matrix provides a convenient vehicle for identifying interferences between groups of links of the wireless network.

Alternatively, for at least some embodiments, characterizing the interference includes generating an interference matrix wherein each entry of the interference matrix includes at least one indicator of interference of an ith link on a jth link. More specifically, for an embodiment, characterizing the interference includes generating an interference matrix wherein each entry of the interference matrix includes the at least one indicator of interference of an ith link on a jth link of the wireless network. Once created, this interference matrix provides a convenient vehicle for identifying interference between links of the wireless network.

As previously described, for at least some embodiments, characterizing interference between at least one link of a first group of the plurality of groups and at least one link of a second group of the plurality of groups includes predicting interference of one or more links of the first group with one or more links of a second group based on simulation and/or testing of network pre-planning.

For at least some embodiments, characterizing interference between at least one link of a first group of the plurality of groups and at least one link of a second group of the plurality of groups includes sensing interference of one or more links of the first group with one or more links of a second group. For an embodiment, interference between links of groups is indicated if the sensed interference is greater than a threshold. For an embodiment, the interference between groups is sensed over time, allowing for adaptive updates to the code assignments. That is, over time different groups of links may cause interferences to be sensed by other different groups. Accordingly, the code assignment for the links can be updated as interference between the groups is sensed.

For at least some embodiments, characterizing interference between at least one link of a first group of the plurality of groups and at least one link of a second group of the plurality of groups includes characterizing interference of a first number of links of the first group with a second number of links of a second group. That is, interferences is indicated if the first number links of the first group are determined to be interfering with the second number of links of the second group.

Phase Rotation Assignment

As previously stated, for an embodiment, different groups are specific symbol phase rotation. Further, for an embodiment, groups that interfere with each other are assigned specific symbol phase rotation based on level of correlation between the available specific symbol phase rotations. That is, it is desirable to assign specific symbol phase rotation that are the least (or below threshold) correlated to the groups that interfere with each other.

For an embodiment, due to the finite number of available specific symbol phase rotations, different groups are assigned the same specific symbol phase rotations. That is, if there are large enough number of groups, all of the available specific symbol phase rotations can be used up during assignment to the groups, and at least some specific symbol phase rotations will have to be reused with multiple groups. Ideally, groups assigned the same co specific symbol phase rotation do not have any interference with each other. However, if there is some interference between groups and all available specific symbol phase rotations have been used, the specific symbol phase rotations are reused based on the correlation between the available specific symbol phase rotations and the level of interference between the groups being assigned.

As will be described later, at least some embodiments further include receiving, by a sector of the wireless network, data to be transmitted over a specific wireless link of the wireless network, wherein the specific wireless link belongs to one of the first group or the second group. A packet for transmission over the specific wireless link is configured, wherein the packet includes a preamble and the data. For an embodiment, configuring the packet includes obtaining a specific symbol phase rotation based on the assigned the specific symbol phase rotation of the first group or second group of the specific wireless link, and rotating the phase of a sequence of symbols that are to be transmitted through the specific wireless link. Finally, the configured packet is transmitted over the wireless link.

FIG. 10 is a flow chart that includes steps of a method of assigning phase rotations for symbols transmitted through one or more of groups of links, according to an embodiment. A first step 1010 includes grouping links of a wireless network into a plurality of groups based on connectivity of the links between sectors of nodes of the wireless network. A second step 1020 includes characterizing interference between at least one link of a first group of the plurality of groups and at least one link of a second group of the plurality of groups. A third step 1030 includes assigning at least one specific symbol phase rotation to the first group and at least one other specific symbol phase rotation to the second group based on the characterizing of the interference. Different specific symbol phase rotations are assigned to the groups that are determined to interfere with each other.

Figure 11:
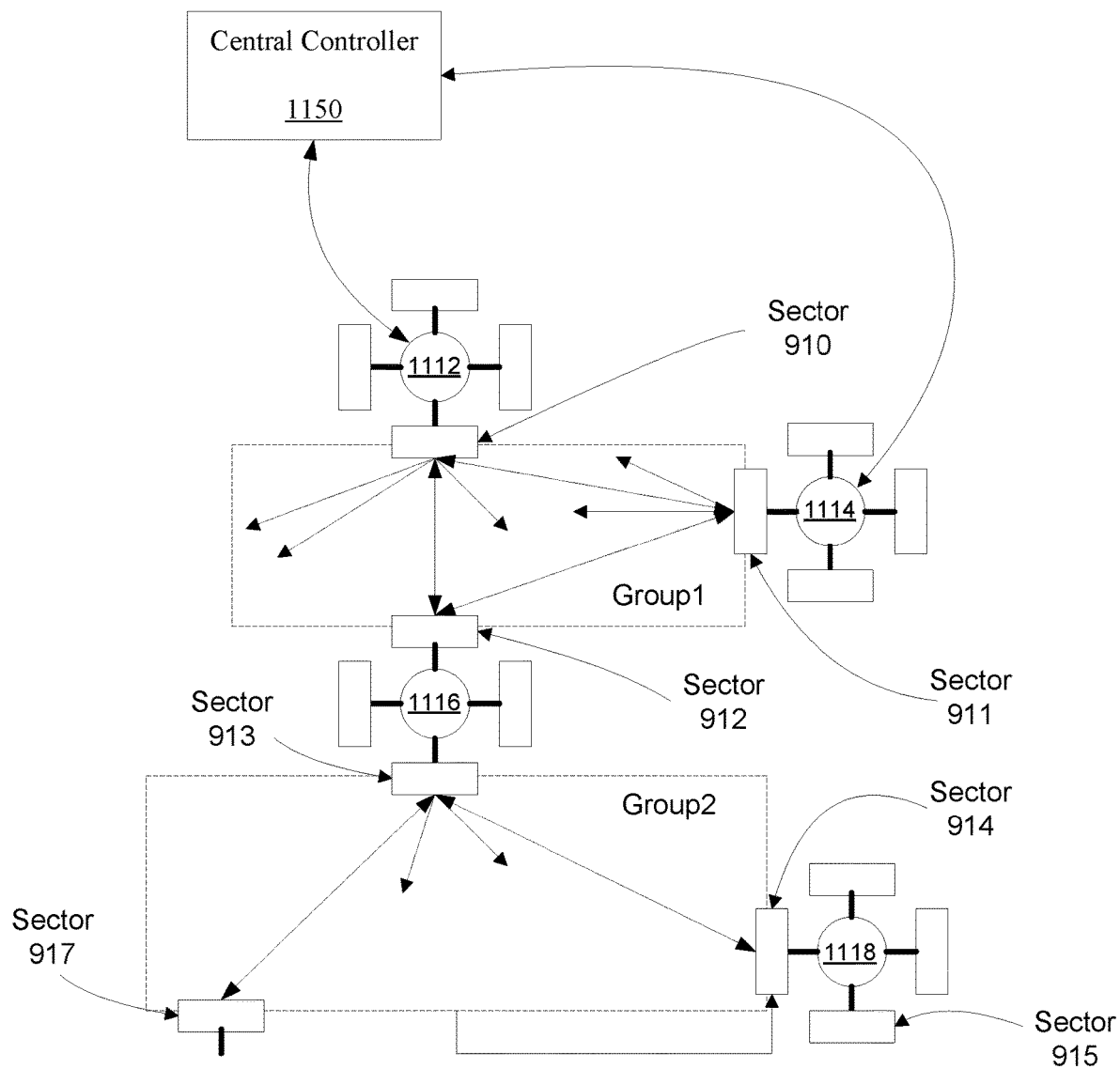
FIG. 11 is a block diagram of a wireless network, according to an embodiment.

FIG. 11 is a block diagram of a wireless network, according to an embodiment.

As shown the wireless network includes multiple nodes 1112, 1114, 1116, 1118 and a central controller 1150. Further, one or more of the nodes 1112, 1114, 1116, 1118, include multiple sectors, such as sectors 910, 911, 912, 913, 914, 915, 915. As shown, the central control 1150 is connected to at least one of the nodes 1112, 1114.

For at least some embodiments, one or more of the steps of grouping links of a wireless network into a plurality of groups based on connectivity of the links between sectors of nodes of the wireless network, characterizing interference between at least one link of a first group of the plurality of groups and at least one link of a second group of the plurality of group, and assigning at least one specific symbol phase rotation to the first group and at least one other specific symbol phase rotation to the second group based on the characterizing of the interference, occurs at the central server. For at least some embodiments, one or more of the steps of grouping links of a wireless network into a plurality of groups based on connectivity of the links between sectors of nodes of the wireless network, characterizing interference between at least one link of a first group of the plurality of groups and at least one link of a second group of the plurality of group, and assigning at least one specific symbol phase rotation to the first group and at least one other specific symbol phase rotation to the second group based on the characterizing of the interference, occurs at one or more of the nodes or sectors of the wireless network. For at least some embodiments, at least some of the steps occur upstream from the central controller, such as, in the cloud.

Figure 12:
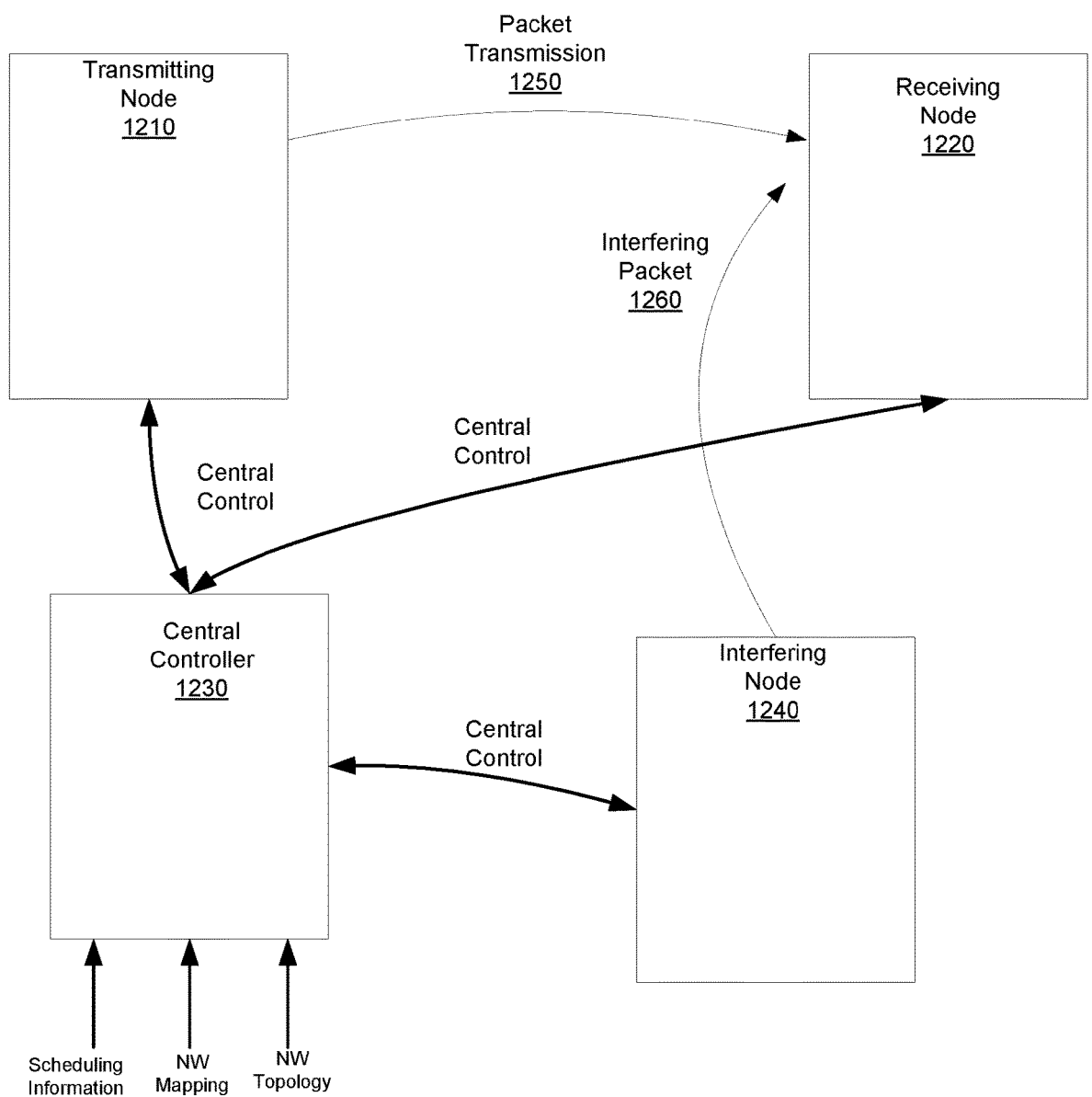
FIG. 12 shows a transmitting node, a receiving node, an interfering node, and a central controller, according to an embodiment.

FIG. 12 shows a transmitting node 1210, a receiving node 1220, an interfering node 1240, and a central controller 1230, according to an embodiment. For an embodiment, the central controller 1230 receives NW (network) mapping information that allows for a determination of interfering nodes. For an embodiment, the central controller 1230 receives NW topology information that allows for a determination of interfering nodes.

For an embodiment, the central controller 1230 controls the transmission of training signal between the transmitting node 1210 and the receiving node 1220 through, for example, packet 1250. Further, for an embodiment, the central controller 1230 controls the transmission of training signal between the interfering node 1240 and the receiving node 1220, thereby allowing a characterization of interference (interfering packet 1260) between the interfering node 1240 and the receiving node 1220.

For at least some embodiments, the central controller 1230 uses any combination of the NW mapping information, the NW topology information, training information of the transmission channel between the transmitting node 1210 and the receiving node 1220, or training information of the transmission channel between the interfering node 1240 and the receiving node 1220.

For an embodiment, the central controller 1230 provides scheduling (for example, MAC (media access control)) for the transmission of packets by the transmitting node 1210 and reception of packets by the receiving node 1220. For an embodiment, the central controller 1230 provides an indicator to the receiving node 1220 of when the central controller 1230 has scheduled the interfering node 1240 to transmit potentially interfering packets. As stated, for an embodiment, the central controller 1230 provides scheduling of packet transmission of the transmitting node, the receiving node, and interfering nodes. Further, the central controller 1230 can aid in the determination and characterization of interference between the nodes. That is, the central controller 1230 can monitor interference between nodes and aid in the identification of which nodes interfere with other nodes.

A computer storage medium can be, or can be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium also can be, or can be included in, one or more separate physical components or media (e.g., multiple CDs, disks, or other storage devices). The operations described in this specification can be implemented as operations performed by a data processing apparatus on data stored on one or more computer-readable storage devices or received from other sources.

The term "processor" encompasses all kinds of apparatus, devices, and machines for processing data, including, for example, a programmable processor, a computer, a system on a chip, or multiple ones, or combinations, of the foregoing. The apparatus can include special-purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services and distributed computing and grid computing infrastructures.

A computer program (also known as a program, software, software application, script, or code) can be written in any form of programming language, including compiled or interpreted languages and declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special-purpose logic circuitry, e.g., an FPGA or an ASIC.

Processors suitable for the execution of a computer program include, for example, both general and special-purpose microprocessors and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic disks, magneto-optical disks, or optical disks. Devices suitable for storing computer program instructions and data include all forms of nonvolatile memory, media and memory devices, including, for example, semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special-purpose logic circuitry.

From the foregoing, it will be appreciated that specific embodiments of the invention have been described herein for purposes of illustration, but that various modifications may be made without deviating from the scope of the invention. Accordingly, the invention is not limited except as by the appended claims.

We claim:

1. A wireless network, comprising:
   a plurality wireless nodes, wherein the plurality of wireless nodes communicate with each other through a plurality of wireless links, and wherein each wireless link of the plurality of nodes is assigned a specific symbol phase rotation based on a classification of the wireless link;
   wherein each of the nodes comprises:
      a transceiver;
      an antenna;
      a processor; and
      a memory for storing program instructions that are executable by the processor to:
         construct a packet including data that is to be transmitted to a receiving node in the wireless network through a specific wireless link of the plurality of wireless links, wherein the constructed packet includes a plurality of symbols, wherein constructing the packet for transmission over the specific wireless link comprises the program instruction executing the processor to:
            retrieve a specific symbol phase rotation based on the specific wireless link over which the plurality of symbols are to be transmitted over;
            rotate a phase of each successive symbol of the plurality of symbols based on the specific symbol phase rotation of the specific wireless link, and based on a position of the symbol within the constructed packet, wherein the position of the symbol occurs just after a previous symbol position in time, and wherein the rotated phase of each successive symbol changes with time irrespective of a type of the successive symbol;
         control transmission by the transceiver through the antenna the constructed packet after the phase of each successive symbol of the plurality of symbols have been rotated.

2. The wireless network of claim 1, wherein wireless links that are classified differently are assigned a different specific symbol phase rotation.

3. The wireless network of claim 1, wherein a receiving node operates to receive the constructed packet through the specific wireless link, and reciprocally rotate a phase of each successive received symbol of the plurality of symbols based on the specific symbol phase rotation of the specific wireless link, and based on a position of the symbol within the received constructed packet.

4. The wireless network of claim 1, wherein each of the wireless links are classified as belonging to one of a plurality of groups of wireless links, and wherein the specific symbol phase rotation of the specific wireless link is determined by which group of the plurality of groups the specific wireless link belongs to.

5. The wireless network of claim 4, wherein one or more of the plurality of groups of wireless lines includes a plurality of wireless links.

6. The wireless network of claim 5, wherein the plurality of wireless links are each assigned to a group of the plurality of groups of wireless links based on connectivity of the wireless links between the nodes of the wireless network.

7. The wireless network of claim 5, wherein wireless links of each node are assigned to a same group of the plurality of groups.

8. The wireless network of claim 5, wherein wireless links of a plurality of nodes are assigned to a same group of the plurality of groups based on the connectivity of the wireless links between the plurality of nodes of the wireless network.

9. The wireless network of claim 4, wherein interference is characterized between at least one wireless link of a first group of the plurality of groups and at least one wireless link of a second group of the plurality of groups, wherein at least one of the first group or the second group includes the specific wireless link, and wherein the specific symbol phase rotation is assigned to the first group and a second specific symbol phase rotation is assigned to the second group based on the characterizing of the interference.

10. A method, comprising:
communicating, by a plurality wireless nodes, with each other through a plurality of wireless links, and wherein each wireless link of the plurality of nodes is assigned a specific symbol phase rotation based on a classification of the wireless link;
constructing, by a node, a packet including data that is to be transmitted to a receiving node in the wireless network through a specific wireless link of the plurality of wireless links, wherein the constructed packet includes a plurality of symbols,
retrieving the specific symbol phase rotation based on a classification of the specific wireless link over which the plurality of symbols are to be transmitted over;
rotating a phase of each successive symbol of the plurality of symbols based on the specific symbol phase rotation of the specific wireless link, and based on a position of the symbol within the constructed packet, wherein the position of the symbol occurs just after a previous symbol position in time, and wherein the rotated phase of each successive symbol changes with time irrespective of a type of the successive symbol; and
controlling transmission by the node through an antenna of the node the constructed packet after the phase of each successive symbol of the plurality of symbols have been rotated.

11. The method of claim 10, further comprising assigning a different specific symbol phase rotation to wireless links that are classified differently.

12. The method of claim 10, further comprising receiving, by a receiving node, the constructed packet through the specific wireless link, and reciprocally rotating a phase of each successive received symbol of the plurality of symbols based on the specific symbol phase rotation of the specific wireless link, and based on a position of the symbol within the received constructed packet.

13. The method of claim 10, further comprising classifying each of the wireless links as belonging to one of a plurality of groups of wireless links, and wherein the specific symbol phase rotation of the specific wireless link is determined by which group of the plurality of groups the specific wireless link belongs to.

14. The method of claim 13, wherein one or more of the plurality of groups of wireless lines includes a plurality of wireless links.

15. The method of claim 14, further comprising assigning each of the plurality of wireless links to a group of the plurality of groups of wireless links based on connectivity of the wireless links between the nodes of the wireless network.

16. The method of claim 14, wherein wireless links of a plurality of nodes are assigned to a same group of the plurality of groups based on the connectivity of the wireless links between the plurality of nodes of the wireless network.

17. The method of claim 13, further comprising:
characterizing interference between at least one wireless link of a first group of the plurality of groups and at least one wireless link of a second group of the plurality of groups, wherein at least one of the first group or the second group includes the specific wireless link; and
assigning the specific symbol phase rotation to the first group and assigning a second specific symbol phase rotation to the second group based on the characterizing of the interference.

18. A node, comprising:
a transceiver;
an antenna;
a processor; and
a memory for storing program instructions that are executable by the processor to:
construct a packet including data that is to be transmitted to a receiving node in a wireless network, wherein the constructed packet includes a plurality of symbols, wherein constructing the packet for transmission over a specific wireless link comprises the program instruction executing the processor to:
retrieve the specific symbol phase rotation based on a classification of the specific wireless link over which the plurality of symbols are to be transmitted over;
rotate a phase of each successive symbol of the plurality of symbols based on the specific symbol phase rotation of the specific wireless link, and based on a position of the symbol within the packet wherein the position of the symbol occurs just after a previous symbol position in time, and wherein the rotated phase of each successive symbol changes with time irrespective of a type of the successive symbol; and
control transmission by the transceiver through the antenna the constructed packet after the phase of each successive symbol of the plurality of symbols have been rotated.

* * * * *